US012691612B2

(12) United States Patent
Yanev et al.

(10) Patent No.: US 12,691,612 B2
(45) Date of Patent: Jul. 28, 2026

(54) INJECTION MOULDING PROCESS FOR THE PREPARATION OF A FOAMED ARTICLE WITH IMPROVED SURFACE QUALITY

(71) Applicant: SABIC Global Technologies B.V., Bergen op Zoom (NL)

(72) Inventors: Angel Yanev, Maastricht (NL); Kar-Man Raymond Chu, Maastricht (NL); Junhua Zhang, Etten-Leur (NL); Dimphna Johanna Maria van Beek, Sittard (NL); Daniel Bande, Antwerp (BE)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 267 days.

(21) Appl. No.: 18/571,997

(22) PCT Filed: Jun. 21, 2022

(86) PCT No.: PCT/EP2022/066932
§ 371 (c)(1),
(2) Date: Dec. 19, 2023

(87) PCT Pub. No.: WO2022/268843
PCT Pub. Date: Dec. 29, 2022

(65) Prior Publication Data
US 2024/0286325 A1 Aug. 29, 2024

(30) Foreign Application Priority Data
Jun. 24, 2021 (EP) ..................................... 21181552

(51) Int. Cl.
*B29C 44/58* (2006.01)
*B29C 44/42* (2006.01)
(Continued)

(52) U.S. Cl.
CPC ............ *B29C 44/586* (2013.01); *B29C 44/42* (2013.01); *B29C 44/585* (2013.01);
(Continued)

(58) Field of Classification Search
CPC . B29C 44/3496; B29C 44/348; B29C 44/083; B29C 33/302; B29C 31/04; B29C 44/585; B29C 44/42; B29C 44/586
See application file for complete search history.

(56) References Cited

U.S. PATENT DOCUMENTS 4,489,033 A 12/1984 Uda et al.
6,451,230 B1 9/2002 Eckardt et al.
(Continued)

FOREIGN PATENT DOCUMENTS

CN 106280019 A † 1/2017
CN 109721851 A † 5/2019
(Continued)

OTHER PUBLICATIONS

International Search Report for International Application No. PCT/EP2022/066932; International Filing Date Jun. 21, 2022; Date of Mailing Sep. 16, 2022; 4 pages.
(Continued)

*Primary Examiner* — Stella K Yi
(74) *Attorney, Agent, or Firm* — CANTOR COLBURN LLP

(57) ABSTRACT

The present invention relates to an injection moulding process for the preparation of a foamed article with improved surface quality. The present invention further relates to a foamed article obtained or obtainable by the injection moulding process.

20 Claims, 2 Drawing Sheets

(51) Int. Cl.

| | | |
|---|---|---|
| B29K 23/00 | (2006.01) |
| B29K 105/00 | (2006.01) |
| B29K 105/04 | (2006.01) |
| B29K 105/16 | (2006.01) |

(52) U.S. Cl.
   CPC .. *B29K 2023/12* (2013.01); *B29K 2105/0094* (2013.01); *B29K 2105/04* (2013.01); *B29K 2105/16* (2013.01)

(56) References Cited

U.S. PATENT DOCUMENTS

| | | |
|---|---|---|
| 2009/0148698 A1 | 6/2009 | Kawaguchi et al. |
| 2012/0128957 A1 | 5/2012 | Arai |

FOREIGN PATENT DOCUMENTS

| | | | |
|---|---|---|---|
| CN | 111286117 A | † | 6/2020 |
| EP | 1166991 A2 | | 1/2002 |
| EP | 3760409 A1 | | 1/2021 |
| JP | H11156881 A | | 6/1999 |
| JP | 2015223811 A | † | 12/2015 |
| JP | 2017177669 A | † | 10/2017 |
| JP | 2019171871 A | † | 10/2019 |
| JP | 020104410 A | † | 7/2020 |
| WO | 2014038609 A1 | † | 3/2014 |
| WO | 2021130139 A1 | † | 7/2021 |

OTHER PUBLICATIONS

Written Opinion for International Application No. PCT/EP2022/066932; International Filing Date Jun. 21, 2022; Date of Mailing Sep. 16, 2022; 6 pages.

Hou, et al., Polypropylene/talc foams with high weight-reduction and improved surface quality fabricated by mold-opening microcellular injection molding, Journal of Materials Research and Technology, vol. 12, May-Jun. 2021, pp. 74-86—Available online Feb. 25, 2021.†

† cited by third party

INJECTION MOULDING PROCESS FOR THE PREPARATION OF A FOAMED ARTICLE WITH IMPROVED SURFACE QUALITY

CROSS-REFERENCE TO RELATED APPLICATIONS

This application is a National Stage application of PCT/EP2022/066932, filed Jun. 21, 2022, which claims the benefit of European Application No. 21181552.7, filed Jun. 24, 2021, both of which are incorporated by reference in their entireties herein.

BACKGROUND

The present invention relates to an injection moulding process for the preparation of a foamed article with improved surface quality. The present invention further relates to a product directly and/or indirectly obtained from such process.

Injection moulding is a moulding process widely used in various industrial field, e.g. packaging, home appliance, automotive because of its short circle time comparing to other moulding processes. Most often the injection moulding process is used for the preparation of a solid (non-hollow) article, it could also be employed for the preparation of a foamed article. For instance, a foamed article can be prepared in a core-back injection moulding process as disclosed in JP11-156881. A typical core-back injection moulding process compress the following sequential steps:

Closing the mould to form a mould cavity;

Injecting a foamable polymer composition into the mould cavity;

Opening the mould cavity, at least partially to allow the foamable polymer composition to expand and form a soft foamed article;

Allowing the soft foamed article to solidify to form the foamed article and eject the foamed article from the mould.

It was often found that foamed article produced by this core-back injection moulding process has surface defects, e.g. presence of "orange-peel" like surface and/or dimples. A dimple on the surface of a foamed article is a shallow depression on the surface of the foamed article due to the collapse of the foam structure. "Orange-peel" like surface is an uneven and/or crumpled surface with similar topography as an orange peel.

SUMMARY

Therefore it is the object of the present invention to provide a process for the preparation of a foamed article wherein the foamed article has improved surface quality.

The object of the present invention is achieved by an injection moulding process for preparing a foamed article in a mould comprising the following sequential steps:

a) Closing the mould to form a mould cavity having a volume V1;

b) Injecting a foamable polymer composition into the mould cavity to form a filled mold cavity in which at least 90% of the volume V1 is filled;

c) Applying a pressure P to the foamable polymer composition in the filled mold cavity for a duration t, wherein t is in the range from 1.3 to 10.2 s;

d) Increasing the volume of the filled mould cavity to a volume V2, e.g. by opening the filled mould cavity at least partially to allow expansion of the foamable polymer into a pre-foamed article;

e) Allowing the pre-foamed article to solidify to form the foamed article; and f) Ejecting the foamed article from the mould.

The inventors of the present invention surprisingly found the addition of step c) Applying a pressure P to the foamable polymer composition in the filled mold cavity for a duration t, wherein t is in the range from 1.3 to 10.2 s effectively reduces the surface defect of the foamed article.

DETAILED DESCRIPTION

Figure 1:
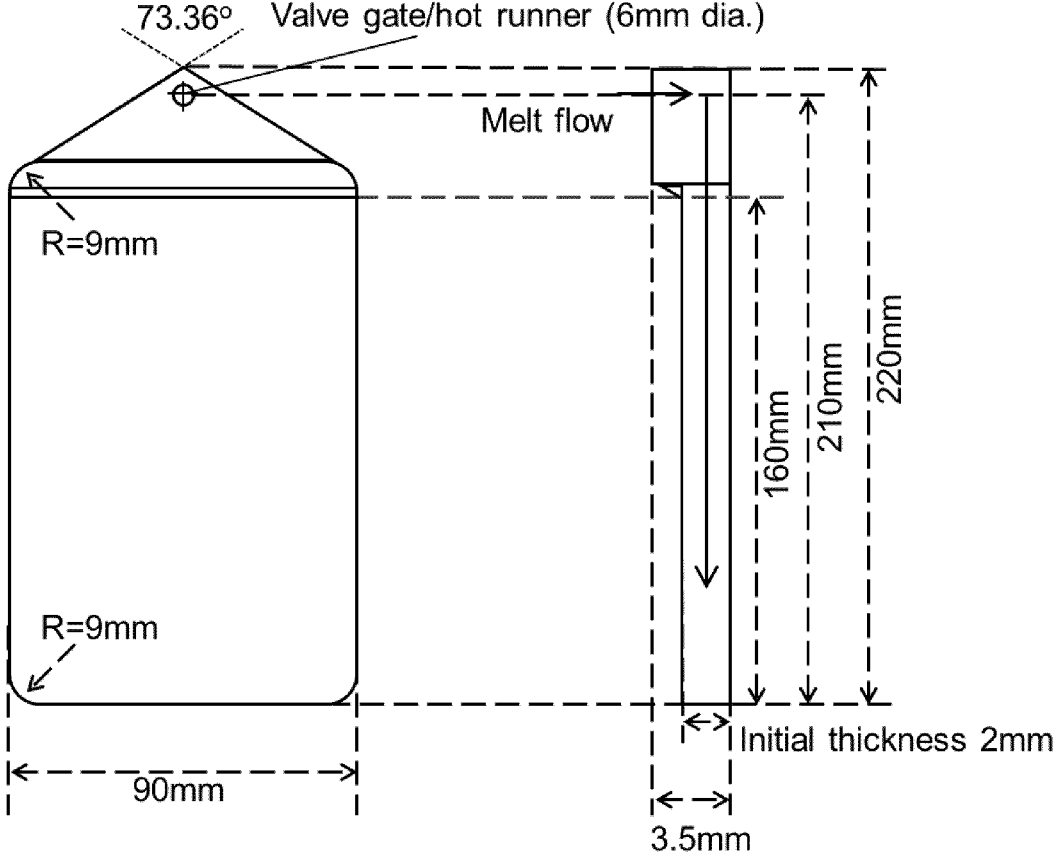
FIG. 1 shows the dimensions of the mould cavity of the Experiment of the present disclosure.

It was found that the foamed article prepared by the injection moulding process according to the invention has an improved surface quality with sparse surface defects, preferably the foamed articled prepared by the injection moulding process according to the invention is free of visible surface defect.

Embodiment one of the present invention relates to an injection moulding process for preparing a foamed article in a mould comprising the following sequential steps:

a) Closing the mould to form a mould cavity having a volume V1;

b) Injecting a foamable polymer composition into the mould cavity to form a filled mold cavity in which at least 90% of the volume V1 is filled;

c) Applying a pressure P to the foamable polymer composition in the filled mold cavity for a duration t, wherein t is in the range from 1.3 to 10.2 s, wherein t is not 5 s when P is 400 bar;

d) Increasing the volume of the filled mould cavity to a volume V2, e.g. by opening the filled mould cavity at least partially to allow expansion of the foamable polymer into a pre-foamed article;

e) Allowing the pre-foamed article to solidify to form the foamed article; and f) Ejecting the foamed article from the mould.

Embodiment two of the present invention relates to an injection moulding process for preparing a foamed article in a mould comprising the following sequential steps:

a) Closing the mould to form a mould cavity having a volume V1;

b) Injecting a foamable polymer composition into the mould cavity to form a filled mold cavity in which at least 90% of the volume V1 is filled;

c) Applying a pressure P to the foamable polymer composition in the filled mold cavity for a duration t, wherein t is in the range from 1.3 to 10.2 s, wherein t is not 5 s when: P is 400 bar and Step b) has a duration of 0.21 s and an injection speed of 250 cm$^3$/s and Step e) has a duration of 40 s;

d) Increasing the volume of the filled mould cavity to a volume V2, e.g. by opening the filled mould cavity at least partially to allow expansion of the foamable polymer into a pre-foamed article;

e) Allowing the pre-foamed article to solidify to form the foamed article; and f) Ejecting the foamed article from the mould.

Embodiment three of the present invention relates to an injection moulding process for preparing a foamed article in a mould comprising the following sequential steps:

a) Closing the mould to form a mould cavity having a volume V1;

b) Injecting a foamable polymer composition into the mould cavity to form a filled mold cavity in which at least 90% of the volume V1 is filled, wherein step b) is not injected at an injection speed of 250 cm³/s and step b) does not have a duration of 0.21 s;

c) Applying a pressure P to the foamable polymer composition in the filled mold cavity for a duration t, wherein t is in the range from 1.3 to 10.2 s, wherein P is not 400 bar and t is not 5 s;

d) Increasing the volume of the filled mould cavity to a volume V2, e.g. by opening the filled mould cavity at least partially to allow expansion of the foamable polymer into a pre-foamed article, wherein the duration of step d) is at least or longer than 1 s and the mould cavity is not opened by 1 mm;

e) Allowing the pre-foamed article to solidify to form the foamed article, wherein the duration of step e) is not 40 s; and f) Ejecting the foamed article from the mould.

Embodiment four of the present invention relates to an injection moulding process for preparing a foamed article in a mould comprising the following sequential steps:

a) Closing the mould to form a mould cavity having a volume V1;

b) Injecting a foamable polymer composition into the mould cavity to form a filled mold cavity in which at least 90% of the volume V1 is filled;

c) Applying a pressure P to the foamable polymer composition in the filled mold cavity for a duration t, wherein t is in the range from 1.3 to 10.2 s;

d) Increasing the volume of the filled mould cavity to a volume V2, e.g. by opening the filled mould cavity at least partially to allow expansion of the foamable polymer into a pre-foamed article;

e) Allowing the pre-foamed article to solidify to form the foamed article, wherein the duration of step e) is not 40 s; and f) Ejecting the foamed article from the mould wherein the process is not a process comprising the following sequential steps:

a1) Closing the mould to form a mould cavity having a volume V11;

b1) Injecting a foamable polymer composition into the mould cavity to form a filled mold cavity in which at least 90% of the volume V11 is filled, wherein step b1) has a duration of 0.21 s and step b1) is injected with an injection speed of 250 cm³/s;

c1) Applying a pressure P1 of 400 bar to the foamable polymer composition in the filled mold cavity for a duration t1 of 5 s;

d1) Increasing the volume of the filled mould cavity to a volume V21, by opening the mould cavity by 1 mm to allow expansion of the foamable polymer into a pre-foamed article, wherein step d) has a duration of at most 1 s or less than 1 s;

e1) Allowing the pre-foamed article to solidify to form the foamed article, wherein the duration of step e1) is 40 s; and f1) Ejecting the foamed article from the mould.

Embodiment one to four can be considered alternative to each other.

Embodiment five of the present invention relates to an injection moulding process for preparing a foamed article in a mould comprising the following sequential steps:

a) Closing the mould to form a mould cavity having a volume V1;

b) Injecting a foamable polymer composition into the mould cavity to form a filled mold cavity in which at least 90% of the volume V1 is filled;

c) Applying a pressure P to the foamable polymer composition in the filled mold cavity for a duration t, wherein t is in the range from 5.1 to 10.2 s, preferably in the range from 5.5 to 10.2 s;

d) Increasing the volume of the filled mould cavity to a volume V2, e.g. by opening the filled mould cavity at least partially to allow expansion of the foamable polymer into a pre-foamed article;

e) Allowing the pre-foamed article to solidify to form the foamed article; and f) Ejecting the foamed article from the mould.

It was surprisingly found that the process according to this embodiment leads to a further improved surface quality of the foamed article.

Foamable Polymer Composition

The foamable polymer composition preferably comprises a thermoplastic composition and at least a foaming agent.

Preferably the amount of the thermoplastic composition is at least 92 wt %, more preferably at least 95 wt %, even more preferably at least 98 wt % based on the total amount of the foamable polymer composition.

Preferably the foamable polymer composition is laden with gas(es) when the foamable polymer composition is heated to molten state wherein the laden gas(es) is issued from a foaming agent.

The foaming agent according to the invention can either be a physical foaming agent or a chemical foaming agent, wherein the chemical foaming agent is a chemical that decomposes at specific temperature to liberate gas(es), wherein physical foaming agent are either volatile liquids or gas(es). Typical chemical foaming agent includes but is not limited to azodicarbonamide, sodium bicarbonate and 5-phenyl tetrazole. Preferably the foaming agent is a chemical foaming agent because it is easier to disperse a chemical foaming agent homogeneously in a polymer composition which leads to a more uniform foam structure.

The thermoplastic composition preferably comprises at least a thermoplastic polymer wherein the thermoplastic polymer is selected from the group consisting of polystyrene, polyethylene, polyamide, polycarbonate, polypropylene and mixtures thereof. Preferably the thermoplastic polymer is a polypropylene.

The thermoplastic composition preferably has a melt flow index (MFI) in the range from 5-120 dg/min, more preferably in the range from 15 to 49 as measured according to ISO1133-1:2011 at 230° C. with a 2.16 kg load.

The thermoplastic composition preferably has a flexural modulus of at least 800 MPa as measured according to ASTM D790-17.

The thermoplastic composition preferably comprises an inorganic filler. Preferably the amount of the inorganic filler is in the range from 5 to 30 wt %, preferably in the range from 5 to 20 wt % based on the total amount of the thermoplastic composition. Suitable examples of inorganic filler include but are not limited to talc, calcium carbonate, wollastonite, barium sulfate, kaolin, glass fibers, laminar silicates (bentonite, montmorillonite, smectite) and mica.

For example, the inorganic filler is selected from the group consisting of talc, calcium carbonate, wollastonite, mica and mixtures thereof.

Preferably, the inorganic filler is a talc.

Injection Moulding Process for Moulding a Foamed Article

Preferably the mould in the injection moulding process of the present invention comprises at least two mould halves.

An injection moulding process according to the invention for preparing a foamed article in a mould comprising the following sequential steps:

a) Closing the mould to form a mould cavity having a volume of V1;

b) Injecting a foamable polymer composition into the mould cavity to form a filled mold cavity in which at least 90% of the volume V1 is filled;

Steps a) and b) are commonly used injection moulding process known in the art. Preferably step b) is carried out after step a) without any delay.

In step b) Injecting a foamable polymer composition into the mould cavity wherein preferably at least 93%, preferably at least 95%, more preferably at least 98% of the volume V1 is filled. The inventor of the present invention surprising found that a higher filling rate leads to an improved surface quality.

The duration of step b) is preferably at most 2.8 s, more preferably at most 1.5 s, even more preferably at most 0.9 s. Shorter duration of the step b) has the advantage of shorter cycle time of the whole injection moulding process.

In the end of step b) the foamable polymer composition is typically in molten state.

The preferred ranges of step b) apply to all embodiments of the invention. In embodiment three of the invention, step b) is not injected at an injection speed of 250 cm³/s and step b) does not have a duration of 0.21 s.

c) Applying a pressure P to the foamable polymer composition in the filled mold cavity for a duration t, wherein t is in the range from 1.3 to 10.2 s.

Preferably step c) is carried out after step b) without any delay.

The presence of step c) is essential to obtain a foamed article with improved surface quality.

The pressure P in step c) is preferably in the range from 21.6 to 2160 bar, more preferably in the range from 46.4 to 1238 bar, even more preferably in the range from 110 to 791 bar. The pressure P can for example be measured by a pressure sensor placed in the mould cavity, or for example by a pressure sensor placed at the injection nozzle. The inventor of the present invention surprisingly found a pressure P in the more preferred range leads to a superior surface quality of the foamed article obtained in step e).

The preferred ranges of the Pressure P apply to embodiments one, two, four and five of the invention.

In embodiment three of the invention, the pressure P in step c) is preferably in the range from 21.6 to 2160 bar, more preferably in the range from 46.4 to 1238 bar, even more preferably in the range from 110 to 791 bar, where in the pressure P is not 400 bar.

The duration t in step c) is preferably in the range from 2.1 to 9.6 s, preferably in the range from 4.7 to 8.2 s. A duration t in the preferred range leads to a good balance between the cycle time of the injection moulding process and the surface quality of the foamed article obtained in step e).

In embodiments one and two of the invention, the duration t in step c) is in the range from 1.3 to 10.2 s, preferably in the range from 2.1 to 9.6 s, more preferably in the range from 4.7 to 8.2 s, wherein t is not 5 s when the conditions set in embodiments one and two are satisfied.

In embodiments three of the invention, the duration t in step c) is in the range from 1.3 to 10.2 s, preferably in the range from 2.1 to 9.6 s, more preferably in the range from 4.7 to 8.2 s, wherein t is not 5 s.

The preferred range of duration t applies to embodiment four of the invention.

In embodiment five of the invention, the duration t in step c) is in the range from 5.1 to 10.2 s, preferably in the range from 5.5 to 10.2 s, more preferably from 5.6 to 9.6 s, more preferably from 5.6 to 8.2 s. It was found that the process according to this embodiment leads to a further improved surface quality of the foamed article.

d) Increasing the volume of the filed mould cavity to a volume V2, by opening the filled mould cavity at least partially to allow the expansion of the foamable polymer composition to a pre-foamed article.

Preferably step d) is carried out after step c) without any delay.

Step d) is commonly used in a core-back injection moulding for the preparation of a foamed article. In step d) by opening the mould cavity at least partially, the laden gas(es) in the foamable polymer composition is allowed to expand. The expansion of the laden gas(es) leads to the expansion of the foamable polymer composition to form into a pre-foamed article in the shape of opened mould cavity.

Preferably the mould cavity is opened partially.

Preferably the duration of step d) is at most 5 s, more preferably at most 2 s.

Preferably the mould cavity is opened by moving at least one of the mould halves.

Preferably the mould cavity is opened by at most 11.2 mm, more preferably at most 7.3 mm, more preferably at most 5.2 mm, more preferably at most 4.3 mm, even more preferably at most 3.8 mm.

Preferably the mould cavity is opened by at least 0.2 mm, more preferably at most 0.5 mm.

The preferred ranges of step d) apply to all embodiments, in embodiment three of the invention, the mould cavity is not opened by 1 mm and the duration of step d) is at least or longer than 1 s.

e) Allowing the pre-foamed article to solidify to form the foamed article; and f) Ejecting the foamed article from the mould.

Preferably step e) is carried out after step d) without any delay.

Preferably step f) is carried out after step e) without any delay.

Step e) and f) is typically used in injection moulding process known in the art.

The preference of step e) applies to all embodiments of the claim, in embodiment three the duration of step e) is not 40 s.

In a preferred embodiment, the process of the present invention further comprise a subsequent step g) wherein the foamed article obtained in step f) is painted.

The present invention further relates to a painted foamed article obtained in step g).

Foamed Article

The present invention further relates to a foamed article obtained or obtainable by the injection moulding process.

The foamed article prepared in the process of the present invention is preferably has a weight in the range from 0.3 to 20 kg.

The foamed article prepared in the process of the present invention preferably has an expansion ratio in the range from 1.05 to 3.14, preferably in the range from 1.38 to 2.97, more preferably in the range from 1.49 to 1.82, wherein the expansion ratio is the ratio between the density of the foamable polymer composition before foaming and that of the foamed article, wherein the density is measured according to ISO 1183-1:2012.

The foamed article prepared in the process of the present invention is preferably an automotive part, preferably a trim part. For example, an automotive interior trim part; for example an automotive exterior trim part.

Experiment

Materials

Composition 1 comprises 98 wt % PPCOMPOUND 9510E commercially available from SABIC and 2 wt % Palmarole MB.BA.24 which is a chemical foaming agent commercially available from Adeka. The weight percentage is based on the total amount of Composition 1.

Composition 2 comprises 98.4 wt % PP 595A commercially available from SABIC, 1 wt % Polybatch FPE 50T from A. Shulman and 0.6 wt % N2 as physical foaming agent introduced via MuCell system. The weight percentage is based on the total amount of Composition 2.

Both compositions are prepared by dry blending.

Foam Injection Molding

Specimens for surface quality rating were foamed articles prepared by core-back foam injection moulding in an Arburg Allrounder 520H 1500-800 unit. The core-back foam injection moulding process consisted of the following sequential steps:

Compositions 1 and 2 were introduced into the hopper of the injection moulding machine respectively. The injection moulding machine settings used were: Barrel temperature 240° C., mould temperature 50° C., Then the composition was transferred from the hopper into the barrel and the composition was allowed to The mould halves were then held at the same position for 40 s;

Ejecting the foamed article for surface quality evaluation.

Conditions for the preparation of specimens S, T1, T2 and P are given in Table 1. Pressure P is measured by a pressure sensor placed on the nozzle of the injection moulding machine.

Density Measurement

Density measurement was carried out according to ISO 1183-1:2012.

Surface Quality Evaluation

Foamed injection moulded articles were visually observed for occurrence of surface defect on both sides. The surface quality was evaluated on a rating of 1 to 3, 3 being the best.

| Surface quality rating | description |
| --- | --- |
| 1 | Presence of evident "orange-peel" like surface and/or dense surface dimples Dimple: Shallow depression on the surface of the foamed article due to the collapse of the foam structure. "Orange-peel" like surface: Uneven and/or crumpled surface with similar topography as an orange peel. |
| 2 | Presence of sparse dimples and/or vague "orange-peel" like surface |
| 3 | No surface defect visible |

Result

Conditions for the preparation of specimens S, T1, T2 and P and surface quality of the specimens are given in the table below:

TABLE 1

| | | Composition 1 | | Composition 2 | | |
| --- | --- | --- | --- | --- | --- | --- |
| | | Specimen 1 | Specimen 2 | Specimen 3 | Specimen 4 | Specimen 5 |
| Injection conditions | S (cm3/s) | 55 | 55 | 196.6 | 196.6 | 196.6 |
| | T1 (s) | 0.86 | 0.86 | 0.22 | 0.22 | 0.22 |
| | T2 (s) | 0 | 2.0 | 0 | 5.0 | 7.0 |
| | P (bar) | — | 150 | — | 585 | 585 |
| Surface quality rating | | 1 | 2 | 1 | 2 | 3 |
| Density before foaming (g/cm3) | | 1.055 | 1.055 | 0.905 | 0.905 | 0.905 |
| Density after foaming (g/cm3) | | 0.703 | 0.703 | 0.603 | 0.603 | 0.603 |
| Expansion ratio | | 1.50 | 1.50 | 1.50 | 1.50 | 1.50 | become fully molten. The two mould halves were closed for form the mould cavity (The dimensions of the mould cavity are given in FIG. 1).

Figure 2:
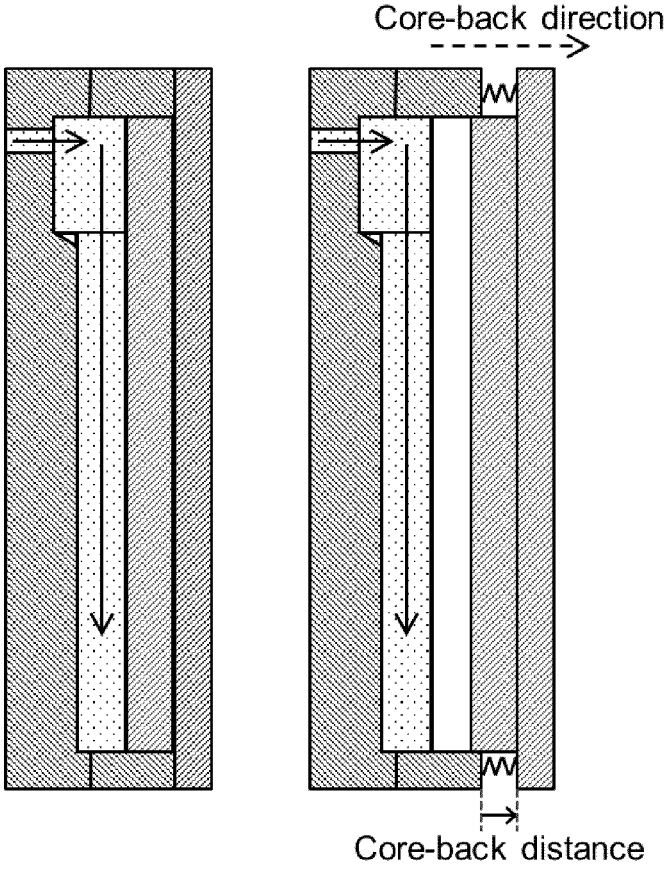
FIG. 2 shows steps in the Experiment of the present disclosure.

Then the molten composition (melt) was injected into the mould cavity with an injection speed of S with a duration of the injection step of T1, wherein the mould cavity is fully filled;

The injected melt was held in the mould for T2 with a pressure of P, after which the mould was opened at a core-back distance of 1 mm in 1 s to let the injected melt expand into the foamed article (FIG. 2);

According to Table 1, the presence of a compression step after filing the mould cavity with molten composition leads to improved surface quality. Especially by comparison of Specimen 5 with other specimens, a compression pressure of 585 bar and a compression duration of 7.0 s leads to a superior surface quality.

The invention claimed is:

1. An injection moulding process for preparing a foamed article in a mould comprising the following sequential steps:

a) Closing the mould to form a mould cavity having a volume V1;

b) Injecting a foamable polymer composition into the mould cavity to form a filled mold cavity in which at least 90% of the volume V1 is filled;

c) Applying a pressure P to the foamable polymer composition in the filled mold cavity for a duration t, wherein P is in the range from 21.6 to 2160 bar, and t is in the range from 1.3 to 10.2 s;

d) Increasing the volume of the filled mould cavity to a volume V2 to allow expansion of the foamable polymer into a pre-foamed article;

e) Allowing the pre-foamed article to solidify to form the foamed article; and f) Ejecting the foamed article from the mould.

2. An injection moulding process for preparing a foamed article in a mould comprising the following sequential steps:

a) Closing the mould to form a mould cavity having a volume V1;

b) Injecting a foamable polymer composition into the mould cavity to form a filled mold cavity in which at least 90% of the volume V1 is filled;

c) Applying a pressure P to the foamable polymer composition in the filled mold cavity for a duration t, wherein P is in the range from 21.6 to 2160 bar, and t is in the range from 5.1 to 10.2 s;

d) Increasing the volume of the filled mould cavity to a volume V2 to allow expansion of the foamable polymer into a pre-foamed article;

e) Allowing the pre-foamed article to solidify to form the foamed article; and f) Ejecting the foamed article from the mould.

3. The injection moulding process according to claim 1, wherein P is in the range from 46.4 to 123821.6 to 2160 bar.

4. The injection moulding process according to claim 1, wherein t is in the range from 2.1 to 9.6 s.

5. The injection moulding process according to claim 1, wherein the foamed article has an expansion ratio in the range from 1.05 to 3.14, wherein the expansion ratio is the ratio between the density of the foamable polymer composition before foaming and that of the foamed article and wherein the density is measured according to ISO 1183-1: 2012.

6. The injection moulding process according to claim 1, wherein the mould cavity is opened by at most 11.2 cm.

7. The injection molding process according to claim 1, wherein the foamable polymer composition comprises a thermoplastic composition and at least a foaming agent.

8. The injection molding process according to claim 7, wherein the thermoplastic composition has a melt flow index (MFI) in the range from 5-120 dg/min, as measured according to ISO1133-1:2011 at 230° C. with a 2.16 kg load.

9. The injection molding process according to claim 7, wherein the amount of the thermoplastic composition is at least 92 wt %, based on the total amount of the foamable polymer composition.

10. The injection molding process according to claim 7, wherein the thermoplastic composition comprise an inorganic filler.

11. The injection molding process according to claim 7, wherein amount of the inorganic filler is in the range from 5 to 30 wt %, based on the total amount of the thermoplastic composition.

12. The injection molding process according to claim 7, wherein the thermoplastic composition comprises a thermoplastic polymer, wherein the thermoplastic polymer is a polypropylene.

13. The injection moulding process according to claim 1, wherein P is in the range from 110 to 791 bar.

14. The injection moulding process according to claim 2, wherein P is in the range from 46.4 to 1238 bar.

15. The injection moulding process according to claim 2, wherein P is in the range from 110 to 791 bar.

16. The injection moulding process according to claim 1, wherein P is equal to 400 bar; and t is in the range from 1.3 to less than 5 s or from greater than 5 to 10.2 s.

17. The injection moulding process according to claim 1,
   wherein P is in the range from 21.6 to less than 400 bar or from greater than 400 to 2160 bar;
   t is in the range from 1.3 to less than 5 s or from greater than 5 to 10.2 s;
   step (b) has a duration of greater or less than 0.21 s, and is injected with an injection speed of greater or less than 250 cm³/s; and
   step (e) has a duration of greater or less than 40 s.

18. The injection moulding process according to claim 1, wherein P is in the range from 21.6 to less than 400 bar or greater than 400 to 2160 bar.

19. The injection moulding process according to claim 1, wherein t is in the range from 1.3 to less than 5 s or greater than 5 to 10.2 s.

20. The injection moulding process according to claim 1, wherein P is in the range from 21.6 to less than 400 bar or greater than 400 to 2160 bar and t is in the range from 1.3 to less than 5 s or greater than 5 to 10.2 s.

* * * * *